United States Patent
Imai et al.

(10) Patent No.: US 7,814,505 B2
(45) Date of Patent: Oct. 12, 2010

(54) OBJECTIVE-LENS DRIVING DEVICE UTILIZING TRACKING COILS AND FOCUS COILS ARRANGED IN SERIES

(75) Inventors: Kenichi Imai, Ota (JP); Noboru Onojima, Takasaki (JP)

(73) Assignee: Sanyo Electric Co., Ltd., Osaka (JP)

( * ) Notice: Subject to any disclaimer, the term of this patent is extended or adjusted under 35 U.S.C. 154(b) by 1073 days.

(21) Appl. No.: 11/442,455

(22) Filed: May 26, 2006

(65) Prior Publication Data
US 2006/0280060 A1      Dec. 14, 2006

(30) Foreign Application Priority Data
Jun. 8, 2005      (JP)      ................ 2005-168012

(51) Int. Cl.
G11B 7/09      (2006.01)
(52) U.S. Cl. ................................ 720/681
(58) Field of Classification Search ........... 720/681, 720/682, 683, 685, 659, 658
See application file for complete search history.

(56) References Cited

U.S. PATENT DOCUMENTS

| | | | | |
|---|---|---|---|---|
| 7,028,318 B2 * | 4/2006 | Tajiri | ................ | 720/684 |
| 7,319,564 B2 * | 1/2008 | Yamada | ................ | 359/824 |
| 7,535,663 B2 * | 5/2009 | Choi et al. | ................ | 359/824 |
| 2006/0077781 A1 * | 4/2006 | Yamada | ................ | 369/44.14 |
| 2006/0077782 A1 * | 4/2006 | Yamada | ................ | 369/44.14 |
| 2008/0204906 A1 * | 8/2008 | Van Rooij et al. | ................ | 359/814 |
| 2008/0253239 A1 * | 10/2008 | Kimura et al. | ................ | 369/44.17 |

FOREIGN PATENT DOCUMENTS

| | | |
|---|---|---|
| CN | 1622208 | 6/2005 |
| JP | 2226522 A | 9/1990 |
| JP | 2001118269 A | 4/2001 |
| JP | 2003-045054 A | 2/2003 |
| JP | 2005182930 A * | 7/2005 |
| JP | 2006344276 A * | 12/2006 |

OTHER PUBLICATIONS

State Intellelctual Property Office of P.R. China, Office Action dated Jul. 6, 2007, (6 pages).
Japanese Patent Office "Notice of Grounds for Rejection," Patent Application No. 2005-168012, Drafted Feb. 9, 2010, 4 pages.

* cited by examiner

*Primary Examiner*—Julie Anne Watko
(74) *Attorney, Agent, or Firm*—Pillsbury Winthrop Shaw Pittman LLP

(57) ABSTRACT

A lens holder is configured by coupling an upper piece and a lower piece. First bobbin portions around which respective tracking coils are wound are provided in one of the upper and lower pieces, and second bobbin portions around which respective focusing coils are wound are provided in the other one of the upper and lower pieces.

7 Claims, 6 Drawing Sheets

OBJECTIVE-LENS DRIVING DEVICE UTILIZING TRACKING COILS AND FOCUS COILS ARRANGED IN SERIES

CROSS-REFERENCE TO RELATED APPLICATIONS

The entire disclosure of Japanese Patent Application No. 2005-168012, including specification, claims, drawings, and abstract, is incorporated herein by reference.

BACKGROUND OF THE INVENTION

1. Field of the Invention

The present invention relates to an objective-lens driving device in which a lens holder on which an objective lens is mounted is displaceably and elastically supported by an actuator frame.

2. Description of the Related Art

As is well known, in an objective-lens driving device in an optical head for optically reading a signal from or writing a signal into a signal storage medium such as a disc, a lens holder on which an objective lens is mounted is displaceably supported by an actuator frame, and focusing coils, tracking coils, and, as necessary, tilt coils are mounted on the lens holder. By arranging the respective effective regions of the foregoing driving coils in a predetermined magnetic field created by a magnetic circuit, the objective lens is driven in response to respective signals supplied to the driving coils.

The method of mounting driving coils on a lens holder includes affixing driving coils that have preliminarily been wound to the lens holder, winding the driving coils directly around the lens holder as a bobbin, and affixing printed coils to the lens holder after configuring the driving coils with the printed coils formed as strip conductors on printed boards. The method of winding the driving coils directly around the lens holder as a bobbin has an advantage in terms of driving performance and assembly efficiency; in many cases, employing this method for an objective-lens driving device is desirable.

Meanwhile, as an objective-lens driving device, a configuration is known in which tracking coils rectangularly wound in such a way that the center axes of the windings are perpendicular to the tracking direction or the focusing direction are mounted on the lens holder in such a way as to oppose the magnetic-pole surfaces of magnets configuring a magnetic circuit.

In the objective-lens driving device, regions parallel to the focusing direction are formed in two sides of each tracking coil; therefore, by making the polarities, at the two sides, of magnetic flux generated by the magnets contrary to each other, the two sides can serve as regions for effectively driving the objective lens in the tracking direction, thereby enhancing driving sensitivity in the tracking direction.

Meanwhile, in objective-lens driving devices, in many cases, by arranging an objective lens in the center of the lens holder, arranging a pair of magnets that form a magnetic circuit so as to flank the lens holder, in a direction perpendicular to the tracking direction or the focusing direction, and mounting on the lens holder a pair each of driving coils opposing the magnet, the center of driving force that acts on the lens holder is made to coincide with that of the objective lens, whereby satisfactory performance can be obtained.

In recent objective-lens driving devices, in order to make the optical axes of laser beams radiated onto a disc perpendicular to the disc so as to cope with an increase in disc density, tilt coils are mounted on the lens holder so that the objective lens can be driven obliquely in a direction in which the disc slants; i.e., in the radial skew direction.

Meanwhile, in the case of an objective-lens driving device in which tracking coils wound in such a way that the center axes of the windings are perpendicular to the tracking direction or the focusing direction are mounted on the lens holder, in general, the tracking coil and a focusing coil are arranged in a superimposed fashion so that the same magnetic field generated by a magnetic circuit can be utilized; therefore, an objective-lens driving device such as this cannot employ a configuration in which the tracking coils are wound directly around the lens holder, whereby the objective-lens driving device has had a disadvantage in assembly efficiency; and because, due to superimposition of the tracking coil and the focusing coil, the magnetic gap cannot be narrowed, the objective-lens driving device has had a disadvantage in enhancement of driving sensitivity.

Additionally, in the case of an objective-lens driving device in which the objective lens can be driven obliquely in the radial skew direction, in general, two pairs of focusing coils and tilt coils or two focus coils are arranged so as to flank the objective lens in the tracking direction and the magnetic circuit is configured in such a way that respective coils at both sides of the objective lens are arranged in magnetic fields whose polarities are contrary to each other. An objective-lens driving device such as this cannot employ a configuration in which the two pair of focusing coils and tilt coils or the two focusing coils cannot be wound directly around the lens holder; additionally, because, in order to use the tracking coils effectively, the tracking coils are often inserted between the focusing coils, there cannot be employed a configuration in which the tracking coils are wound directly around the lens holder, whereby there has been a problem in terms of assembly efficiency. Moreover, with regard to the focusing coils at both sides of the objective lens, the focusing coil and the tracking coil are often arranged in a superimposed fashion; therefore, the objective-lens driving device has had a disadvantage in terms of driving sensitivity.

SUMMARY OF THE INVENTION

In the present invention, a lens holder is configured by coupling an upper piece and a lower piece, wherein first bobbin portions around which respective tracking coils are wound are provided in one of the upper and lower pieces, and second bobbin portions around which respective focus coils are wound are provided in the other one of the upper and lower pieces.

BRIEF DESCRIPTION OF THE DRAWINGS

Preferred embodiments of the present invention will be described in detail by reference to the following drawings, wherein.

DESCRIPTION OF PREFERRED EMBODIMENTS

Figure 1:
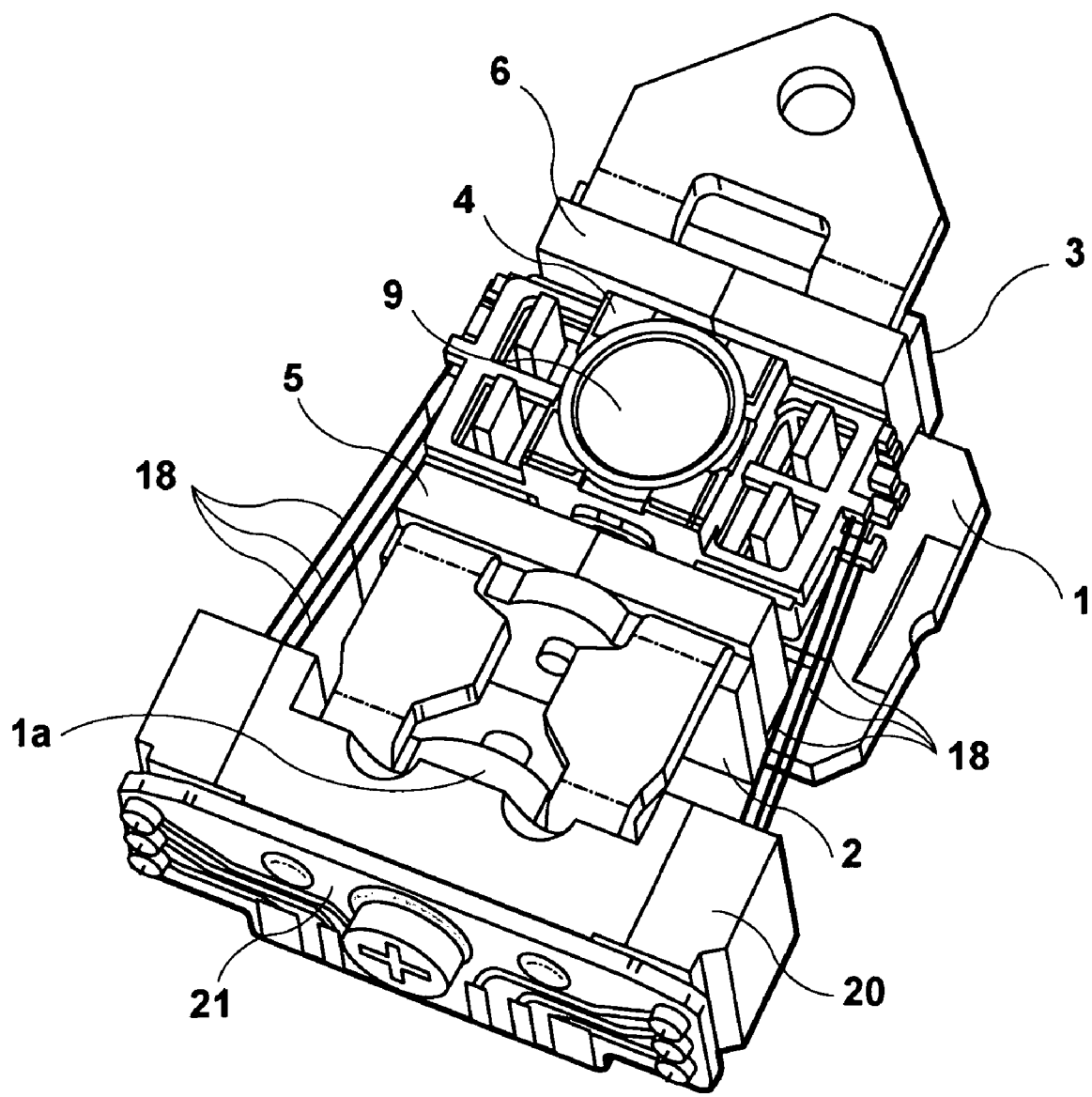
FIG. 1 is a perspective view illustrating an example, in a completed state, of an objective-lens driving device according to the present invention.
Figure 2:
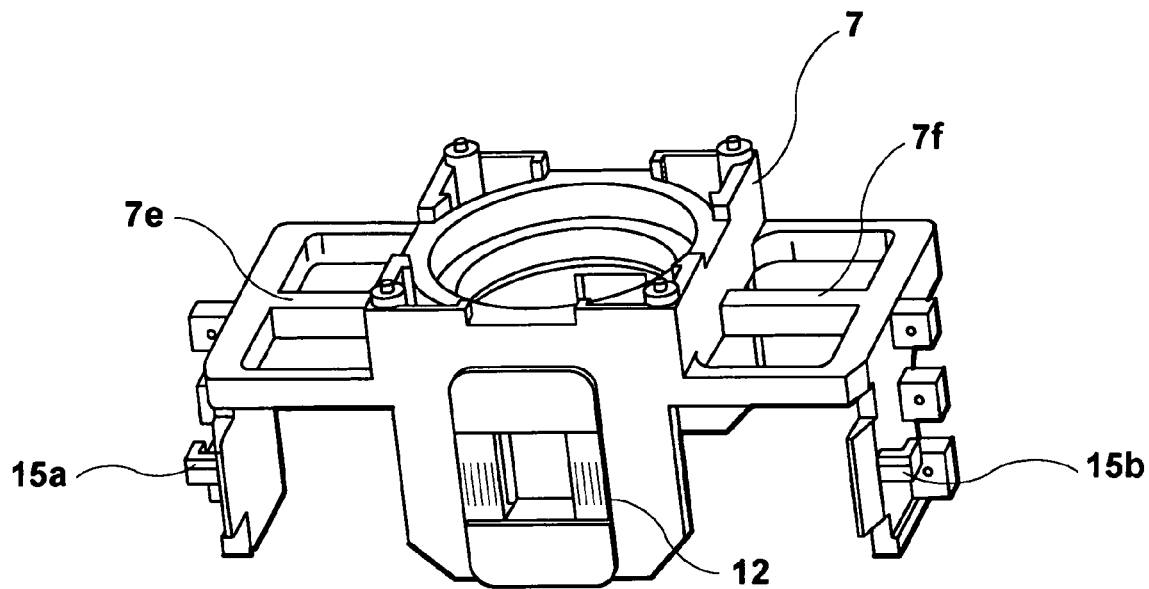
FIG. 2 is a development perspective view illustrating a lens holder, of the objective-lens driving device in FIG. 1, that is a main part related to the present invention.
Figure 2:
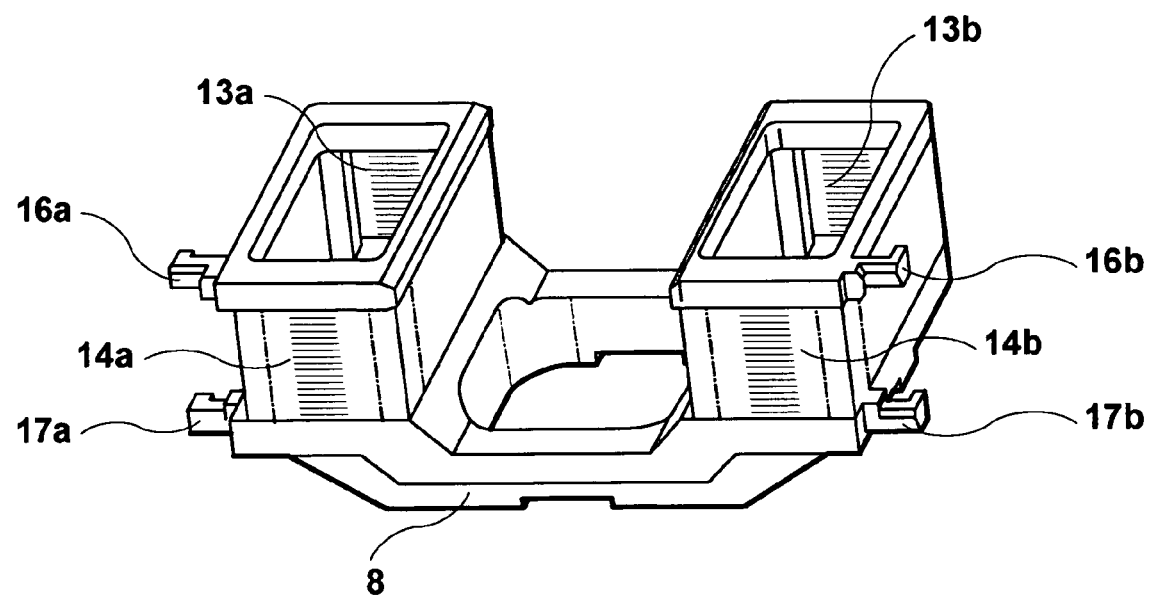

FIG. 1 is a perspective view illustrating an example, in a completed state, of an objective-lens driving device according to the present invention; and FIG. 2 is a development perspective view illustrating a lens holder, of the objective-lens driving device in FIG. 1, that is a main part related to the present invention.

External yoke portions 2 and 3 are formed, through sheet metal machining of a soft-iron metal plate, integrally with an actuator frame 1; to the external yoke portions 2 and 3, a pair of main magnets 5 and 6 are attached, respectively, that are arranged opposing each other in such a way that a lens holder 4 is sandwiched therebetween.

Figure 3:
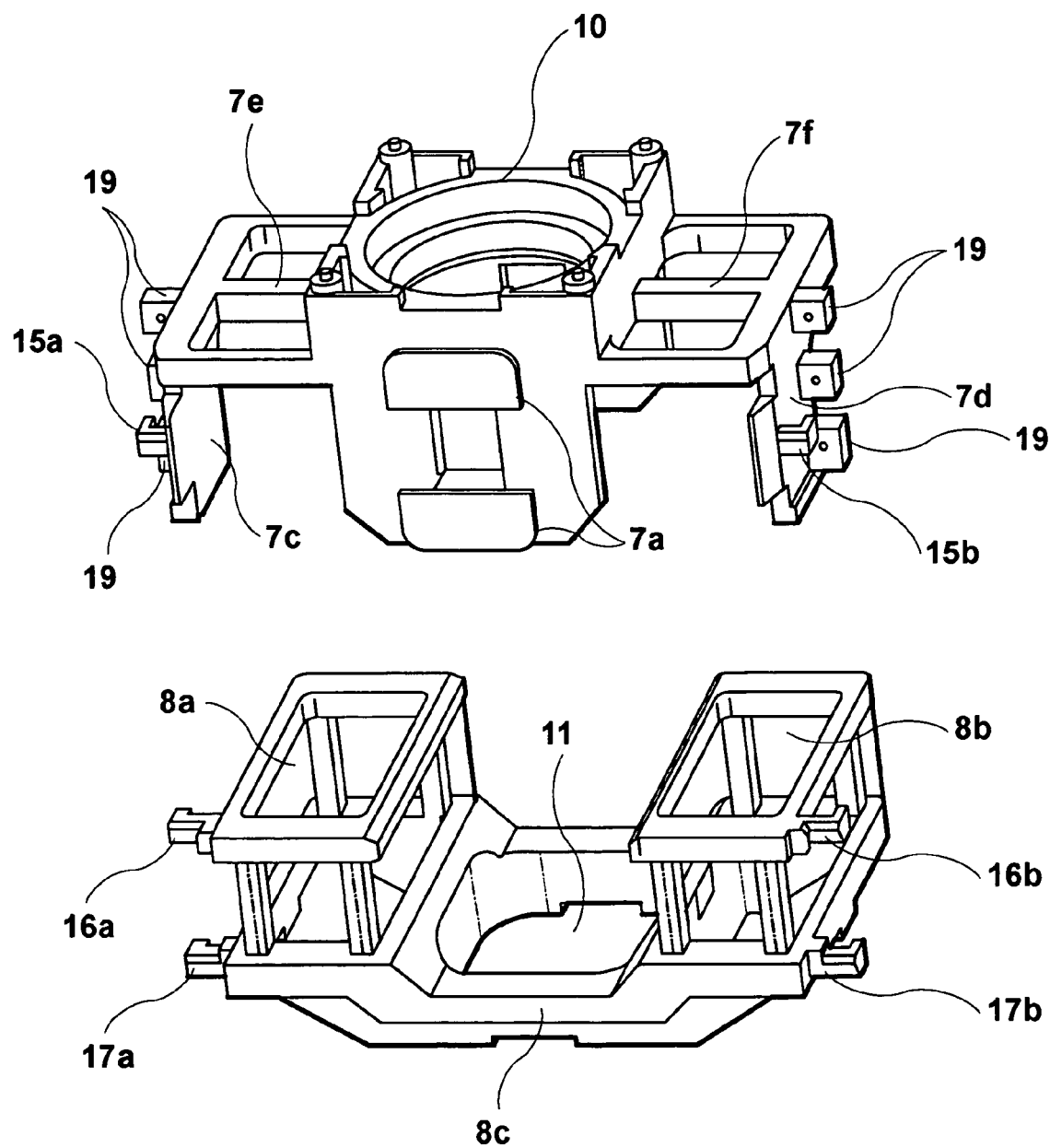
FIG. 3 is a development perspective view for explaining the configuration of a lens holder 4.

The lens holder 4 is configured by coupling an upper piece 7 with a lower piece 8; as illustrated in a development perspective view in FIG. 3, in the upper piece 7, there are integrally formed a lens-mounting portion 10 on the center portion of which an objective lens 9 can be mounted, and respective first bobbin portions 7a (the first bobbin portion 7a opposing the main magnet 6 is not illustrated) situated on the center portions of sidewalls that are in parallel with the tracking direction and oppose the main magnets 5 and 6, respectively. In contrast, in the lower piece 8, two second bobbin portions 8a and 8b are provided in such a way as to avoid the sidewalls on which the respective first bobbin portions 7a of the upper piece 7 situated beneath the objective lens 9 are formed and to make a line in the tracking direction so as to flank the sidewalls. The second bobbin portions 8a and 8b are hollow and rectangular and the respective bottom portions thereof are coupled with each other by a coupling portion 8c in which a light-path hole 11 for the objective lens 9 is formed.

In addition, in the upper piece 7, sidewalls 7c and 7d are formed at both ends, of the upper piece 7, in the tracking direction so as to cover the respective outer side planes of the second bobbin portions 8a and 8b of the lower piece 8. On each of the sidewalls 7c and 7d, three fixation portions 19 are formed spaced approximately evenly apart from one another; and the respective three fixation portions 19 are formed approximately symmetrically with respect to a virtual plane along the optical axis, of the objective lens 9, that is perpendicular to the tracking direction. The fixation portions 19 are used to fix support wires 18 that are elastic support components for displaceably and elastically supporting the lens holder 4 by the actuator frame 1.

Before the lens holder 4 is configured by coupling the upper piece 7 with the lower piece 8, as illustrated in FIG. 2, respective tracking coils 12 are wound around the first bobbin portions 7a on the both sidewalls, of the upper piece 7, that are provided in parallel with the tracking direction. In addition, a focusing coil 13a and a tilt coil 14a are wound coaxially around the second bobbin portion 8a of the lower piece 8; and a focusing coil 13b and a tilt coil 14b are wound coaxially around the second bobbin portion 8b.

Figure 4:
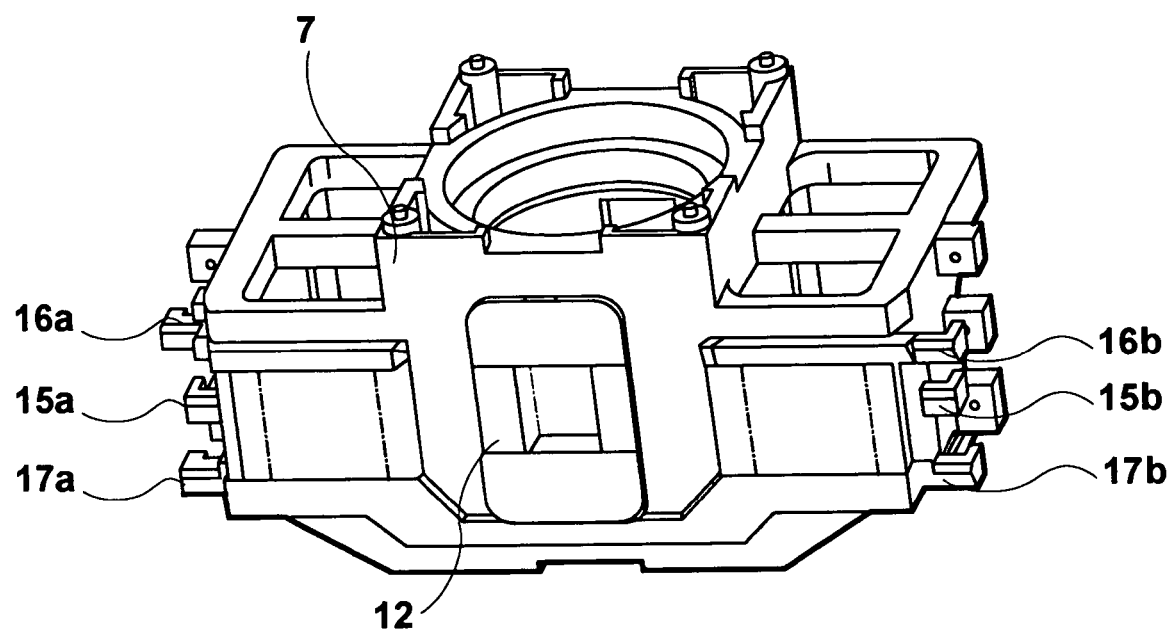
FIG. 4 is a perspective view of the lens holder 4 configured by coupling a upper piece 7 and a lower piece 8.

Thereafter, the upper piece 7 and the lower piece 8 are coupled with each other in such a way that the sidewalls, of the upper piece 7, on which the first bobbin portions 7a are each formed in parallel with the tracking direction and both the second bobbin portions 8a and 8b of the lower piece 8 engage with one another, thereby configuring the lens holder 4, as illustrated in FIG. 4. After the lens holder 4 is configured by coupling the pieces, the tracking coils 12, the focusing coils 13a and 13b, and the tilt coils 14a and 14b are mounted on the lens holder 4.

At the respective positions located in the middle in the height direction and in the vicinity of predetermined edges of the sidewalls 7c and 7d, of the upper piece 7, that are perpendicular to the tracking direction, hook-shaped protrusions 15a and 15b are formed integrally with the sidewalls 7c and 7d, respectively, in such a way as to protrude along the tracking direction. The ends of the wires of the tracking coils 12 that are wound around the respective first bobbin portions 7a are fixedly clamped around the protrusions 15a and 15b.

The coatings on the ends (front ends) of the tracking coils 12 that are made of copper wires; e.g., enamel wires, with the surfaces to which insulation coatings are applied and that are wound around the respective first bobbin portions 7a are peeled off, and the exposed wires are looped around either one of the protrusions 15a and 15b so as to be engaged therewith. The wires are wound a predetermined number of times on the respective first bobbin portions 7a in such a way that the respective winding directions of the wires are contrary to each other; thereafter, the respective ends (terminal ends) of the wires whose coatings have been peeled off are looped around either one, of the protrusions 15a and 15b, with which the front ends are not engaged, so as to be engaged therewith.

From predetermined corners of the respective upper frames and the respective lower frames of the second bobbin portions 8a and 8b of the lower piece 8, respective hook-shaped upper protrusions 16a and 16b and respective hook-shaped lower protrusions 17a and 17b that are formed integrally with the corners of the upper frames and the lower frames, respectively, protrude along the tracking direction. The respective wire ends of the focusing coils 13a and 13b that are continuously wound around the second bobbin portions 8a and 8b, respectively, are clamped around the upper protrusions 16a and 16b. In addition, the respective wire ends of the tilt coils 14a and 14b that are continuously wound around the second bobbin portions 8a and 8b, respectively, are clamped around the lower protrusions 17a and 17b.

The coatings on the ends (front ends) of the focusing coils 13a and 13b that, as is the case with the tracking coils 12, are made of copper wires; e.g., enamel wires, with the surfaces to which insulation coatings are applied and that are wound around the respective second bobbin portions 8a and 8b are peeled off and the exposed wires are looped around either one of the upper protrusions 16a and 16b so as to be engaged therewith. The wires are wound a predetermined number of times on the respective second bobbin portions 8a and 8b in such a way that the respective winding directions of the wires are contrary to each other; thereafter, the respective ends (terminal ends) of the wires whose coatings have been peeled off are looped around either one, of the upper protrusions 16a and 16b, with which the front ends are not engaged, so as to be engaged therewith.

Additionally, the coatings on the ends (front ends) of the tilt coils 14a and 14b that, as is the case with the other coils, are made of copper wires; e.g., enamel wires, with the surfaces to which insulation coatings are applied and that are wound around the respective second bobbin portions 8a and 8b are peeled off and the exposed wires are looped around either one of the lower protrusions 17a and 17b so as to be engaged therewith. The wires are wound a predetermined number of times, coaxially with and superimposed on the respective focusing coils 13a and 13b, around the respective second bobbin portions 8a and/or 8b in such a way that the respective winding directions of the wires are the same; thereafter, the respective ends (terminal ends) of the wires whose coatings have been peeled off are looped around either one, of the lower protrusions 17a and 17b, with which the front ends are not engaged, so as to be engaged therewith.

The respective ends of the six support wires 18 are fixed on a fixation substrate 21. Additionally, to a cut-and-raise portion (part of a component that is cut and then raised) 1a of the actuator frame 1, an auxiliary component 20 as well as the fixation substrate 21 is fixed. By fixing the support wires 18 on the respective fixation portions 19 of the sidewalls 7c and 7d of the upper piece 7, the lens holder 4 that is configured by coupling the upper piece 7 with the lower piece 8 is mounted by means of the six support wires 18; i.e., three support wires for each side.

As described above, through the six support wires 18, the lens holder 4 is supported by the actuator frame 1, displaceably and elastically in the focusing direction, the tracking direction, and the radial-tilt direction.

The respective wire ends, of the six support wires 18, that are not fixed on the fixation substrate 21 are arranged abutting or close to the predetermined protrusions so that the predetermined support wires 18 are each related to the corresponding predetermined driving coils, and connected through soldering to the respective ends of driving-coil wires looped around the predetermined protrusions.

Additionally, the six support wires 18 are each surrounded by a damping agent filled in the auxiliary component 20, whereby vibration is suppressed.

Figure 5:
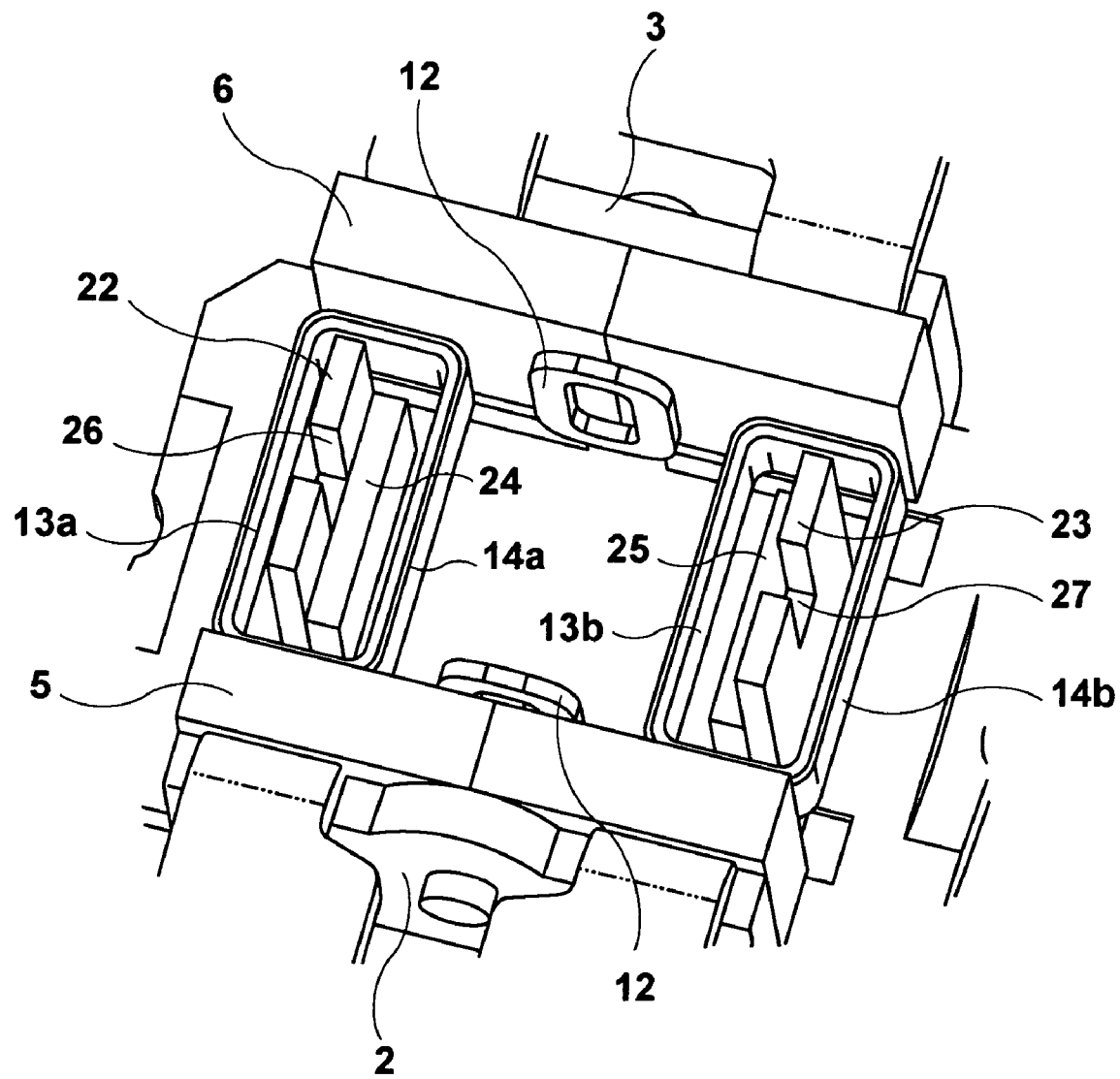
FIG. 5 is a perspective view for explaining the configuration of a magnetic circuit.
Figure 6:
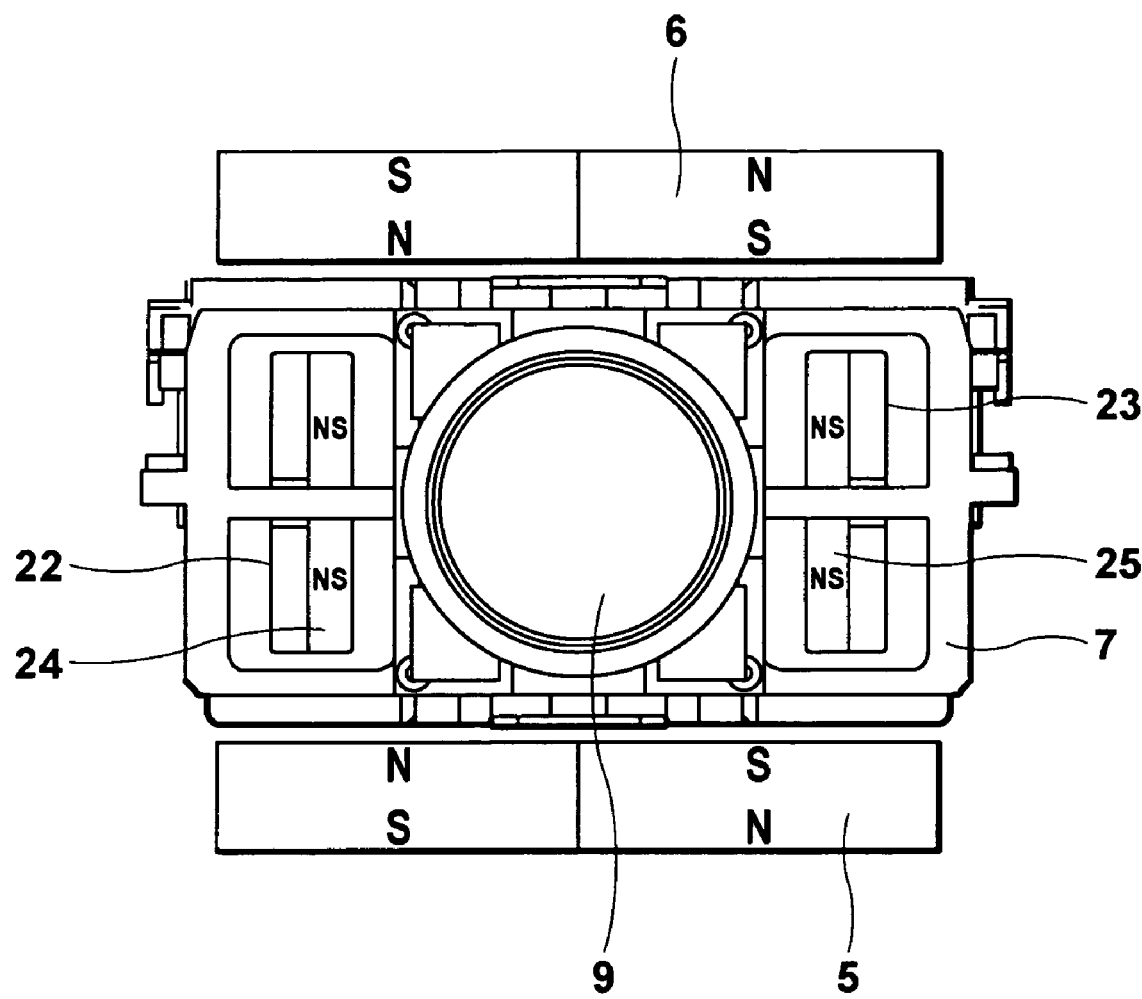
FIG. 6 is a plan view for explaining the magnetic poles of the magnetic circuit.

A magnetic circuit is configured as illustrated in FIG. 5; according to FIG. 6, which is a plan view illustrating magnetic poles of the magnetic circuit, the main magnets 5 and 6 are each divided, at the middle thereof in the tracking direction, into two portions whose magnet-pole polarities are contrary to each other; and the respective portions, having the same magnetic-pole polarity, of the main magnets 5 and 6 oppose each other. In this case, the main magnets 5 and 6 may each be of two individual components that adjoin each other and have contrary magnetic-pole polarities, or may each be of a single component that, through magnetizing, is divided at the middle thereof into two portions having contrary magnetic-pole polarities.

In addition, the second bobbin portions 8a and 8b are each of a hollow structure that is configured in a framework fashion and in a rectangular parallelepiped fashion. In the second bobbin portions 8a and 8b, respective opposing yokes 22 and 23 are arranged. Sub-magnets 24 and 25 are affixed to the opposing yokes 22 and 23, respectively, and respective front and rear faces thereof are magnetized as illustrated in FIG. 6. In the present embodiment, the respective upper portions of the second bobbin portions 8a and 8b are covered by the upper piece 7. The respective portions of the upper piece 7 that covers the upper portions of the second bobbin portions 8a and 8b are in a rectangular framework fashion, and bars 7e and 7f are inserted in the middle of the upper piece 7 in order to enhance its strength. For that purpose, in the upper portions of the opposing yokes 22 and 23, respective U-shaped recesses 26, 27 are formed so as to avoid the bars 7e and 7f. Accordingly, the heights of the opposing yokes 22 and 23 are ensured so as to be the same as those of the main magnets 5 and 6.

With the foregoing magnetic circuit, the respective tracking coils 12 opposing the main magnets 5 and 6 are arranged in the magnetic field created by the magnetic poles of the respective right and left portions of the main magnets 5 and 6 in such a way that the directions of the driving currents that flow in the effective regions of the tracking coils 12 are contrary to each other; and the respective winding directions of the tracking coils 12 are the same, as viewed from the main magnets 5 and 6 that oppose the tracking coils 12. When a tracking error signal is supplied to the tracking coils 12, driving forces are generated through the tracking coils 12, in the same tracking direction. As a result, the lens holder 4 is driven by a displacement amount corresponding to the current of the tracking error signal, in the direction, along the tracking direction, corresponding to the polarity of the tracking error signal.

The supply of the tracking error signal to the tracking coils 12 is implemented by means of the right and left support wires 18 that are provided at the middle position in the vertical direction and by way of the respective ends, of the tracking coils 12, that are looped around the protrusions 15a and 15b.

The respective focusing coils 13a and 13b are wound the same predetermined number of times, in rotation directions that are contrary to each other. Additionally, the respective magnetic-pole polarities, which are the same, of the opposing portions of the main magnets 5 and 6, that flank the focusing coil 13a are contrary to the respective magnetic-pole polarities, which are the same, of the opposing portions of the main magnets 5 and 6 that flank the focusing coil 13b; when a focus error signal is supplied to the focusing coils 13a and 13b, driving forces are generated through the focusing coils 13a and 13b, in the same focusing direction. As a result, the lens holder 4 is driven by a displacement amount corresponding to the current of the focus error signal, in the direction, along the focusing direction, corresponding to the polarity of the focus error signal.

The supply of the focus error signal to the focusing coils 13a and 13b is implemented by means of the right and left support wires 18 that are provided at the top position and by way of the respective ends, of the focusing coils 13a and 13b, that are looped around the protrusions 16a and 16b.

The respective tilt coils 14a and 14b are wound the same predetermined times, in the same rotation direction. Additionally, the respective magnetic-pole polarities, which are the same, of the opposing portions of the main magnets 5 and 6 that flank the tilt coil 14a are contrary to the respective magnetic-pole polarities, which are the same, of the opposing portions of the main magnets 5 and 6 that flank the tilt coil 14b; when a tilt error signal is supplied to the tilt coils 14a and 14b, driving forces are generated through the tilt coils 14a and 14b, in directions, along the focusing direction, that are contrary to each other. As a result, the lens holder 4 is driven by a displacement amount corresponding to the current of the tilt error signal, in the direction, along the radial skew direction, corresponding to the polarity of the tilt error signal.

The supply of the tilt error signal to the tilt coils 14a and 14b is implemented by means of the right and left support wires 18 that are provided at the bottom position and by way of the respective ends, of the tilt coils 14a and 14b, that are looped around the protrusions 17a and 17b.

The magnetic field formed, by way of the opposing yoke 22 and the sub-magnet 24 affixed to the opposing yoke 22, between the main magnets 5 and 6 also effectively acts on the side portions, among the side portions perpendicular to the tracking direction, of the focusing coil 13a and the tilt coil 14a, that are closer to the objective lens 9 than are other side portions; similarly, the magnetic field formed, by way of the opposing yoke 23 and the sub-magnet 25 affixed to the opposing yoke 23, between the main magnets 5 and 6 also effectively act on the side portions, among the side portions perpendicular to the tracking direction, of the focusing coil 13b and the tilt coil 14b, that are closer to the objective lens 9 than are other side portions.

Meanwhile, the upper piece 7 and the lower piece 8 that configure the lens holder 4 can be formed through molding of a synthetic resin composed mainly of a liquid crystal polymer, a polyphenylene sulfide, or the like. Accordingly, not only weight saving through the framework structure but also enhancement of the rigidity through coupling can be achieved.

Additionally, with respect to a virtual plane that is perpendicular to the tracking direction and includes the optical axis of the objective lens 9 and a virtual plane that is parallel to the tracking direction and includes the optical axis of the objective lens 9, not only the respective portions of the actuator moving part consisting of the lens holder 4 on which the objective lens 9 is mounted and the driving coils, but also the respective portions of the magnetic circuit are in plane-symmetry; therefore, twisting vibration is much less likely to occur, whereby the objective-lens driving device is configured so as to effectively suppress phase shifts due to focus high-order vibration and tracking high-order vibration.

In the objective-lens driving device according to the present embodiment, after the tracking coils and the focusing coils are directly wound around the upper piece and the lower piece, respectively, of the lens holder, the pieces are coupled to configure the lens holder on which the tracking coils and the focusing coils are mounted; therefore, assembly efficiency is satisfactory.

In this situation, by providing, on the bobbin portions, respective protrusions around which the ends of the driving coils are looped, the upper piece and the lower piece can be coupled with each other to configure the lens holder, after the ends of the driving coils wound around the bobbin portions are clamped.

Moreover, by coupling the upper piece and the lower piece in such a way that they engage with each other, the lens holder is configured; therefore, the tracking coils and the focusing coils can be arranged in series in the tracking direction in such a way that the respective effective regions of the tracking coil and the focusing coil do not overlap. Accordingly, both the tracking coils and the focusing coils can be arranged in the vicinity of the magnetic-pole surfaces of the corresponding magnets included in the magnetic circuit; therefore, the lens holder has an advantage of enhancing the driving sensitivity in both the tracking and the focusing direction.

Further, the lens holder is configured by making the upper piece and the lower piece engage with each other, thereby coupling them in such a way that the two second bobbin portions flank each of the first bobbin portions; therefore, the tracking coils and the two focusing coils can be wound directly around the corresponding bobbin portions.

In this case, by winding the focusing coil and the tilt coil around each of the two second bobbin portions, coaxially and in an overlapped fashion, the radial tilt control of a disc can be implemented.

Furthermore, the accuracy of the objective-lens optical axis is enhanced by virtue of formation of the fixation portion that fixes an elastic support component to the upper piece on which the objective lens is mounted, whereby the lens holder is supported by the actuator frame by way of the elastic support component,.

What is claimed is:

1. An objective-lens driving device in which a lens holder on which an objective lens is mounted is displaceably and elastically supported by an actuator frame, wherein
the lens holder is configured by coupling an upper piece and a lower piece, first bobbin portions around which respective tracking coils are wound are provided in one of the upper and lower pieces, and second bobbin portions around which respective focus coils are wound are provided in the other one of the upper and lower pieces; and
the lens holder is configured by coupling the upper piece and the lower piece in such a way that the first bobbin portions and the second bobbin portions are combined such that the tracking coils and the focus coils are arranged in series in a tracking direction in such a way that tracking coils are wound around the first bobbin portions, that the focus coils are wound around the second bobbin portions, and that respective effective regions of the tracking coils and the focus coils do not overlap.

2. The objective-lens driving device according to claim 1, wherein the first bobbin portions are provided with protrusions around which respective ends of the tracking coils are clamped, and
the second bobbin portions are provided with protrusions around which respective ends of the focusing coils are clamped.

3. The objective-lens driving device according to claim 1, wherein magnets that generate effective magnetic flux for respective effective regions of the tracking coils and the focusing coils are arranged opposing each other.

4. The objective-lens driving device according to claim 1, wherein the objective lens is mounted on the upper piece, and fixation portions for fixing eleastic support components that support the lens holder displaceably and elastically in the actuator frame are formed in the upper piece.

5. The objective-lens driving device according to claim 1, wherein
in the lens holder, with the upper piece and the lower piece coupled with each other, the two second bobbin portions are arranged in such a way as to be aligned to flank the first bobbin portions in a tracking direction,
the respective tracking coils are arranged around the first bobbin portions,
the effective regions of the focusing coils are aligned so as to flank the tracking coils in the tracking direction,
magnets are arranged opposing each other, with respect to effective regions of the tracking coils and the effective regions of the two focusing coils,
the winding axis of the tracking coil is perpendicular to the tracking direction and a focusing direction,
the magnetic-pole polarity of the magnets at one effective region of the tracking coil and the corresponding focusing coil is opposite the magnetic-pole polarity of the magnets at the other effective region of the tracking coil and the corresponding focusing coil,
and respective tracking drive currents whose directions are contrary to each other are supplied to the one effective region and the other effective region of the tracking coil and respective focus drive currents whose directions are contrary to each other are supplied to the effective regions of the two focusing coils.

6. The objective-lens driving device according to claim 5, wherein a focusing coil and a tilt coil are coaxially wound around each of the two second bobbin portions, in a superimposed fashion.

7. The objective-lens driving device according to claim 5, wherein the objective lens is mounted on the upper piece, the two second bobbin portions are formed in the lower piece, aligned in such a way as to flank the first bobbin portions, respective sidewalls are formed at both sides of the upper piece in such a way to cover the outer side faces of the two second bobbin portions in the lower piece, and fixation portions for fixing elastic support components that support the lens holder displaceably and elastically in the actuator frame are formed on the sidewalls.

* * * * *